United States Patent
Rios et al.

(10) Patent No.: US 8,019,994 B2
(45) Date of Patent: Sep. 13, 2011

(54) AUTHENTICATION OF A REQUEST TO ALTER AT LEAST ONE OF A BIOS AND A SETTING ASSOCIATED WITH THE BIOS

(75) Inventors: Jennifer E. Rios, Houston, TX (US); Lan Wang, Houston, TX (US); Valluddin Y. Ali, Houston, TX (US); Manuel Novoa, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1282 days.

(21) Appl. No.: 11/403,276

(22) Filed: Apr. 13, 2006

(65) Prior Publication Data
US 2007/0245142 A1  Oct. 18, 2007

(51) Int. Cl.
*H04L 9/32* (2006.01)

(52) U.S. Cl. .............. 713/168; 713/1; 713/2; 713/100; 713/183; 726/2; 726/4; 726/5; 726/17; 726/26; 380/277; 380/278; 380/279

(58) Field of Classification Search .................. 713/193, 713/168, 169, 183; 726/2
See application file for complete search history.

(56) References Cited

U.S. PATENT DOCUMENTS

| | | | |
|---|---|---|---|
| 5,859,911 A | 1/1999 | Angelo et al. | |
| 5,963,142 A * | 10/1999 | Zinsky et al. | 340/5.74 |
| 6,009,524 A | 12/1999 | Olarig et al. | |
| 6,581,159 B1 | 6/2003 | Nevis et al. | |
| 6,725,382 B1 * | 4/2004 | Thompson et al. | 726/19 |
| 7,395,434 B2 * | 7/2008 | Piwonka et al. | 713/183 |
| 2002/0004905 A1 | 1/2002 | Davis et al. | |
| 2002/0065978 A1 * | 5/2002 | Mattison | 711/1 |
| 2002/0120845 A1 * | 8/2002 | Cromer et al. | 713/168 |
| 2002/0174353 A1 | 11/2002 | Lee | |
| 2003/0041254 A1 * | 2/2003 | Challener et al. | 713/193 |
| 2004/0015441 A1 * | 1/2004 | Ebihara et al. | 705/50 |
| 2005/0257073 A1 * | 11/2005 | Bade et al. | 713/193 |
| 2006/0020810 A1 | 1/2006 | Waltermann et al. | |

OTHER PUBLICATIONS

PCT Search Report and Written Opinion for PCT/US2007/002670 dated May 7, 2007; 10 pages.
China Office Action, dated Jan. 29, 2010, 6 pages.

\* cited by examiner

*Primary Examiner* — Taghi Arani
*Assistant Examiner* — Jason Lee

(57) ABSTRACT

A system comprises storage and a basic input/output system (BIOS) stored in the storage and adapted to be executed by a processor. The BIOS has an associated setting. The system receives an encrypted value that comprises an encrypted hash of a request to alter at least one of the BIOS and the setting. A first key is used to encrypt the value. The processor uses a second key corresponding to the first key to authenticate said request.

17 Claims, 2 Drawing Sheets

AUTHENTICATION OF A REQUEST TO ALTER AT LEAST ONE OF A BIOS AND A SETTING ASSOCIATED WITH THE BIOS

BACKGROUND

Ensuring the security of a computer system is desirable. For example, a rogue application could attempt to change a computer's basic input/output system (BIOS) code and/or BIOS-related parameters. Doing so could, for example, render the computer inoperative or otherwise compromise the computer's security.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
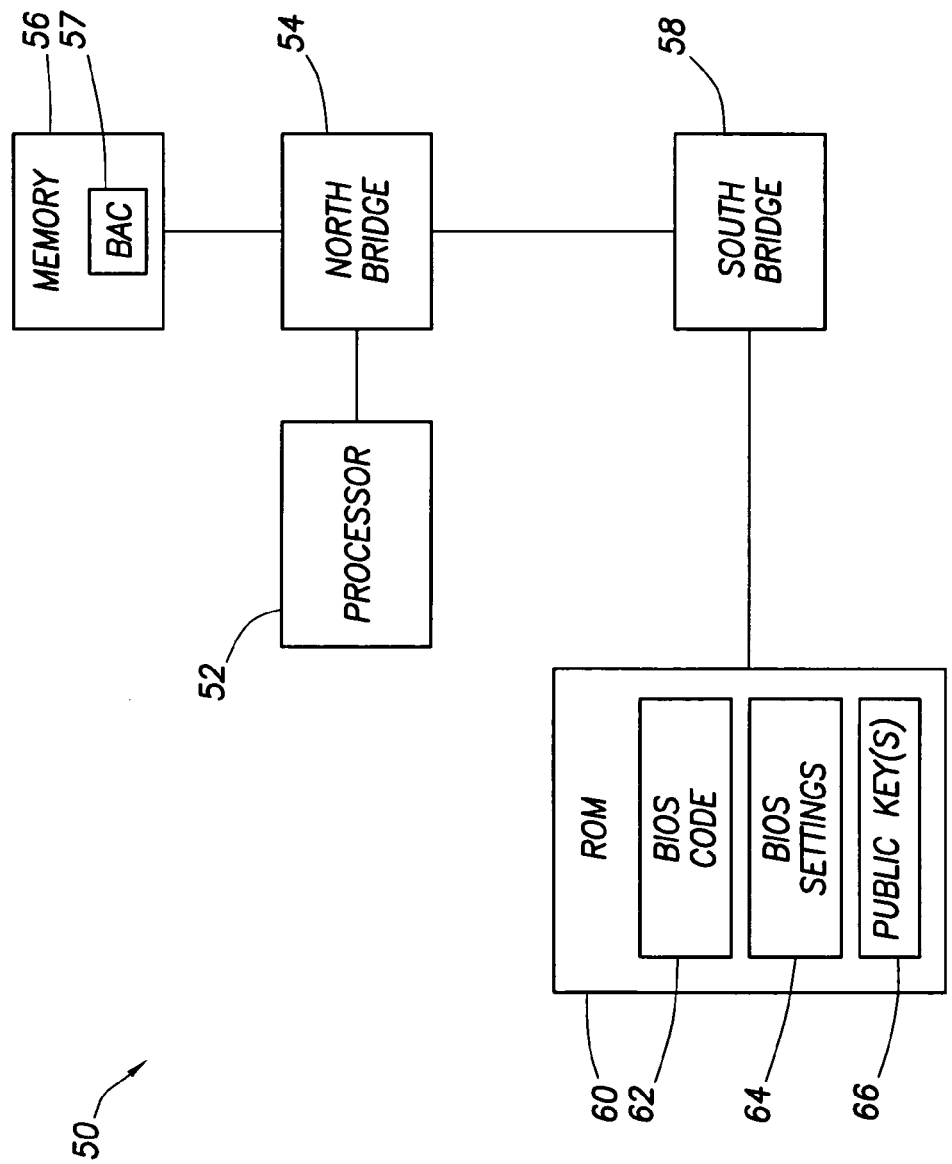
FIG. 1 shows a system diagram in accordance with embodiments of the invention.

Referring to FIG. 1, a system 50 in accordance with an illustrative embodiment of the invention comprises a processor 52, a north bridge 54, memory 56, a south bridge 58, and non-volatile storage 60. In some embodiments, the system 50 comprises a computer (e.g., a server, a notebook, tablet, etc.), but can be other than a computer in other embodiments. In at least one embodiment, non-volatile storage 60 comprises a read-only memory (ROM). The processor 52 operates to execute code contained in the ROM 60 or other storage such as memory 56. The bridges 54 and 58 couple together the processor 52, memory 56 and ROM 60 as shown. Other architectures of system 50 are possible as well.

The ROM 60 comprises basic input/output system (BIOS) code 62. BIOS code 62 is executed by the processor 52 from the ROM 60, or copied to memory 56 for execution therefrom. In at least one embodiment, the BIOS code 62 comprises code that permits the system 50 to be initialized and tested during a boot operation, a process also referred to as power on self-test (POST). In at least some embodiments, the boot process begins with the execution of POST code included within BIOS code 62 directly from the ROM 60. At some point during POST, at least some, if not all, of the BIOS code 62 is copied to, and executed from, memory 56. Memory 56 comprises any suitable type of non-volatile memory such as any of a variety of types of random access memory (RAM). Besides performing a POST process, the BIOS code 62 is also usable to access various relatively low-level functions of the system such as access to storage drives (e.g., hard disk drives, floppy disk drives, etc.), input devices (e.g., keyboard, mouse), and other input and/or output devices.

The ROM 60 also comprises one or more BIOS settings 64. BIOS settings 64 comprise such settings as boot order, drive lock enablement/disablement, and various hardware items (e.g., input/output ports, trusted platform management, etc) enablement/disablement. The BIOS settings 64 may be separate from, but accessible to, the BIOS code 62, or may be embedded within the BIOS code itself.

The contents of the ROM 60 can be modified as desired, a process referred to as "flashing" (or "reflashing") the ROM. In some embodiments, a flashing utility executes. The utility receives a new "image" to be flashed into the ROM, reads the current contents of the ROM, alters the retrieved contents as necessary to be consistent with the new image, and overwrites the ROM with the new information. The particular process for flashing the ROM can be any suitable flashing process. At least the BIOS code 62 and/or the BIOS settings 64, if not all of the contents of the ROM 60, can be modified in this manner.

Embodiments of the present invention comprise a technique that controls modification of some or all of the contents of the ROM 60. In one embodiment, a request to modify a portion or all of the BIOS code 62 and/or BIOS settings 64 is not permitted to be performed until the request can be authenticated. One suitable technique for authenticating such a request is illustrated in FIG. 2.

Figure 2:
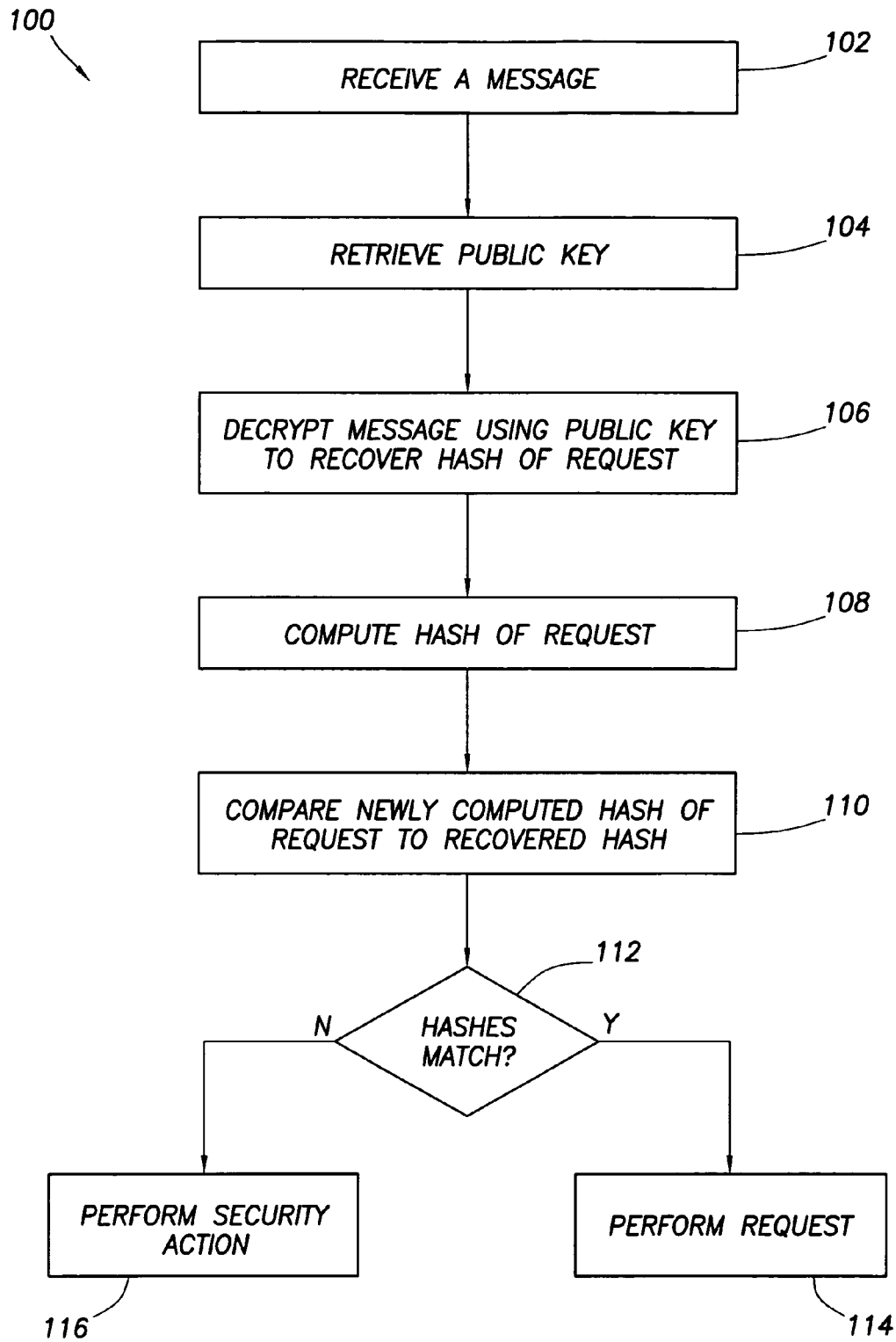
FIG. 2 shows a method in accordance with embodiments of the invention.

Referring now to FIG. 2, an authentication process 100 is shown comprising actions 102-116. The actions depicted can be performed in any order, such as that shown in FIG. 2 or a different order. Some actions can be combined together into a single action. The actions depicted in FIG. 2 are performed by system 50. In accordance with at least some embodiments of the invention, some or all of the actions are performed by code executed by the processor 52. An example of such code is a BIOS access control (BAC) application 57 shown in FIG. 1.

The process 100 depicted in FIG. 2 includes, in at least some embodiments, the use of a "hash" function. A hash is a number generated from a string of, for example, text (in this case, the request to modify contents of the ROM 60). A hash value is generated by a hash mathematical formula in such a way that it is very difficult to recover the original text from the hash values.

The illustrative process 100 described below also refers to the use of a private key and corresponding public key for encryption and decryption purposes. In an illustrative embodiment of a public key/private key encryption protocol, a public key is known or otherwise made available to all intended recipients of an encrypted message and a private key is accessible only to the originator of the message. The private key is used to encrypt the message. The correct public key is used to decrypt the encrypted message. In a public key/private key protocol, the public and private keys are mathematically related to each other in such a way that only the private key can be used to encrypt a message and only the corresponding public key can be used to decrypt the message, or vice versa. Encryption techniques besides public key/private key-based techniques are possible as well.

At 102, the system 50 receives a message. In some embodiments, the message originates from software executing on the system 50, while in other embodiments, the message originates from a source apart from the system 50. The message can be in accordance with any of a variety of formats or protocols. The message is, or contains, a request (e.g., command bytes) to alter at least one of the BIOS code 62 and one or more BIOS settings 64. In at least some embodiments, the request included in the message is encrypted (i.e., not encrypted), while in other embodiments, the request is not encrypted and in yet other embodiments, one or more parts of the request is encrypted. In some embodiments, the message contains an unencrypted request and an encrypted value that comprises an encrypted version of a hash of the request. That is, the request has been hashed by a hash function and the output of the hash function is encrypted. In accordance with an embodiment of the invention, the encryption process uses a private key. A public key 66 (FIG. 1) that corresponds to the private key is stored in ROM 60 or in other storage. In some embodiments, the public key 66 is embedded within the BIOS code 62.

At 104, the public key 66 corresponding to the private key, that was used to encrypt the hash of the request, is retrieved, for example, from ROM 60. The retrieved public key 66 is used in 106 to decrypt the message to recover the hash of the command. At 108, the processor 52, or other logic, computes a hash of the request from the message and, at 110, the newly computed hash is compared to the recovered hash from the decryption process. The two hash values should match if the correct private key was used to encrypt the request hash (i.e., the private key for which the public key in the system 50 corresponds) and the same hash algorithm was used in 108 as was used to form the original message by the source of the message.

Action 112 determines whether the hash values match. If the hash values match, then the request contained in the message is performed in action 114. As explained above and in accordance with various embodiments of the invention, the request causes either or both of at least a portion of the BIOS code 62 and one or more of the BIOS settings 64 to be altered.

If, however, the hashes do not match, then a security action is performed. The security action does not permit the request in the message transmitted to system 50 to be performed, and thus the BIOS code 62 and/or or one or more of the BIOS settings 64 is not altered. Instead, the security action may be to generate a security alert indication that indicates the failure of the authentication process. The alert could be in the form of a message or a value (e.g., a bit) written to a register or memory or shown on a display. Alternatively, the security action may simply be to do nothing.

In accordance with various embodiments of the invention, the message also includes an argument associated with the request to modify the BIOS 62 and/or one or more BIOS settings 64. The argument comprises one or more data values that is used by the system 50 to perform the request, assuming the request is successfully authenticated. Examples of such arguments include a previous (i.e., current) drive lock password and a new drive lock password (if it is desired to change the password), a sequential list of the boot order devices (if it is desired to change the device boot order), and a identifier (e.g., name) of a device and a new state (e.g., enabled, disabled) for such device. In some embodiments, the argument comprises an identifier that specifies the BIOS setting to be modified as well as a new value(s) for the specified setting.

The above discussion is meant to be illustrative of the principles and various embodiments of the present invention. Numerous variations and modifications will become apparent to those skilled in the art once the above disclosure is fully appreciated. In at least one embodiment, the request to alter the BIOS/BIOS setting can be performed without having to reboot the computer. It is intended that the following claims be interpreted to embrace all such variations and modifications.

What is claimed is:

1. A system, comprising:
   storage; and
   a basic input/output system (BIOS) stored in said storage and adapted to be executed by a processor, said BIOS having a setting associated therewith; and
   wherein said system receives an encrypted value that comprises an encrypted hash of a request to alter at least one of said BIOS and said setting, a first key being used to encrypt said value, said value also comprises an argument associated with said request; and
   wherein said processor uses a second key corresponding to said first key to authenticate said request; and
   wherein, if said BIOS setting is to be modified, said argument comprises an identifier that specifies the BIOS setting to be modified as well as a new value for the specified BIOS setting.

2. The system of claim 1 wherein said processor performs a security action if the processor is unable to successfully authenticate said request.

3. The system of claim 2 wherein said security action comprises a security alert indication.

4. The system of claim 1 wherein said processor performs said request if said request is successfully authenticated.

5. The system of claim 1 wherein said processor decrypts said encrypted value using said second key.

6. The system of claim 1 wherein said first key comprises a private key and said second key comprises a public key.

7. The system of claim 1 wherein said second key is embedded in said BIOS.

8. The system of claim 1 wherein said system receives a message, said message comprising said encrypted value and also said request in a form that is not encrypted.

9. A method, comprising:
   receiving an encrypted value that comprises an encrypted hash of a request to alter at least one of a basic input/output system (BIOS) and a setting associated with said BIOS, a first key being used to encrypt said value, said encrypted value also comprises an argument associated with said request; and
   decrypting said encrypted value using a second key to recover said hash of the request, said second key associated with said first key;
   wherein, if said BIOS setting is to be modified, said argument comprises an identifier that specifies the BIOS setting to be modified as well as a new value for the specified BIOS setting.

10. The method of claim 9 further comprising determining whether to perform said request based on said recovered hash of the request.

11. The method of claim 10 further comprising performing a security action upon determining that the request should not be performed.

12. The method of claim 10 further comprising generating a security alert upon determining that the request should not be performed.

13. The method of claim 9 further comprising receiving the request in a form that is not encrypted.

14. The method of claim 13 further comprising computing a new hash of the unencrypted request and comparing said new hash to the recovered hash.

15. A system, comprising:
   means for decrypting an encrypted value from a message, said encrypted value comprising an encrypted first hash of a request to alter at least one of a basic input/output system (BIOS) and a setting associated with said BIOS, a first key being used to encrypt said hash, and said message also comprising a not encrypted form of said request, said encrypted value also comprises an argument associated with said request;

means for computing a second hash of said encrypted request; and means for comparing said first and second hashes to authenticate said message;

wherein, if said BIOS setting is to be modified, said argument comprises an identifier that specifies the BIOS setting to be modified as well as a new value for the specified BIOS setting.

16. The system of claim 15 further comprising means for performing said request if said first and second hashes match.

17. The system of claim 15 further comprising means for performing a security action if said first and second hashes do not match.

* * * * *